(12) United States Patent
Jaramillo et al.

(10) Patent No.: US 6,397,180 B1
(45) Date of Patent: May 28, 2002

(54) METHOD AND SYSTEM FOR PERFORMING SPEECH RECOGNITION BASED ON BEST-WORD SCORING OF REPEATED SPEECH ATTEMPTS

(75) Inventors: Paul D. Jaramillo, Westminster; Frank Haiqing Wu, Louisville, both of CO (US)

(73) Assignee: Qwest Communications International Inc., Denver, CO (US)

( * ) Notice: Subject to any disclaimer, the term of this patent is extended or adjusted under 35 U.S.C. 154(b) by 910 days.

(21) Appl. No.: 08/651,369

(22) Filed: May 22, 1996

(51) Int. Cl.$^7$ .............................................. G10L 15/08
(52) U.S. Cl. ...................................... 704/252; 704/251
(58) Field of Search ................... 395/2.6, 2.61

(56) References Cited

U.S. PATENT DOCUMENTS

| | | | |
|---|---|---|---|
| 4,783,803 A | * 11/1988 | Baker et al. ................. | 704/252 |
| 4,811,399 A | * 3/1989 | Landell et al. ............... | 704/253 |
| 5,504,805 A | * 4/1996 | Dooyong Lee .............. | 379/67 |
| 5,640,485 A | * 6/1997 | Jukka Tapio Ranta ....... | 395/2.6 |

* cited by examiner

*Primary Examiner*—Tālivaldis Ivars Šmits
(74) *Attorney, Agent, or Firm*—Townsend and Townsend and Crew LLP

(57) ABSTRACT

A method and system for improving word classification performance of a speech recognition system having a predefined vocabulary of acceptable words and allowing multiple speech attempts from a user. At least one best word and corresponding word and non-word scores is determined for each speech attempt by the user. At least one common best word is then determined among all the speech attempts. If the highest ranking best word is common across all attempts, that word is used to accept the speech input. Otherwise, an objective measure representing a confidence level of the corresponding word and non-word scores is determined for each of the common best words for each speech attempt by the user. Each of the objective measures is then compared to a predetermined threshold. The speech attempts by the user is then classified based on the comparison of the objective measure to the predetermined threshold.

14 Claims, 4 Drawing Sheets

METHOD AND SYSTEM FOR PERFORMING SPEECH RECOGNITION BASED ON BEST-WORD SCORING OF REPEATED SPEECH ATTEMPTS

TECHNICAL FIELD

This invention relates to voice recognition and, more particularly, to a method and system for improving the performance of a speech recognition system that allows multiple speech attempts by a user.

BACKGROUND ART

Voice recognition is a broad term that includes both recognition of the speech content, referred to as speech recognition, and recognition of the speaker, referred to as speaker recognition. Voice recognition technology can be applied to communication-based information processing in tasks such as bank-by-phone, access to information databases, access to voice mail, etc. Telephone systems are primary components of such processes.

An essential step in voice recognition processes is the comparison of some representation of test speech, referred to as a test speech representation, to a reference representation of the speech, referred to generically as reference speech representations. In the context of voice recognition, reference speech representations are referred to as word models. Test speech is the speech uttered by the user which is to be recognized. If the two representations match, the test speech is said to correspond to the matched reference speech representation. These various representations are generally some transformation of the speech. For example, the word models for the reference speech representations may be parametric representations in the form of Linear Predictive Coding (LPC) coefficients.

Voice recognition generally includes a training procedure and a test procedure. In the training procedure, a training database made up of known speech is analyzed to produce the reference speech representations. The training database typically comprises predetermined speech from one or many different speakers. From the training database, a suitable method is used to produce the reference speech representations. During the voice recognition process, a spoken test speech is analyzed to produce a representation of the test speech compatible with the reference speech representation. The test speech representation for voice recognition is then compared to the reference speech representations to find the highest ranking and most closely matched reference speech representations.

In a typical voice recognition system, the reference speech representations are limited to a set of acceptable word models. That is, a user's speech input is classified (i.e. accepted or rejected) according to the predefined word models. Furthermore, speech representations may be defined for non-words representing the environment of the user (e.g., noisy background) and/or expected extraneous sounds made by the user (e.g., lip smacks). The non-word speech representations are often used in keyword-spotting which enables the recognition of specific vocabulary words that are embedded in a stream of speech and/or noise.

A voice recognition system typically prompts the user for speech input. If the speech input cannot be classified according to the word models, a rejection of the utterance takes place. Upon rejection of the speech input, the voice recognition system may prompt the speaker multiple times in an attempt to eventually accept (i.e., recognize) the speech input, with some limit on how many attempts are requested of the speaker (e.g., two or three).

The known prior art includes voice recognition systems that attempt to classify the speech input independently of each attempt. Thus, there is no reference available upon successive attempts to classify the speech input.

DISCLOSURE OF THE INVENTION

It is thus a general object of the present invention to provide a method and system for improving the performance of a voice recognition system when multiple speech attempts by a user are allowed.

It is yet another object of the present invention to provide a method and system for improving the performance of a voice recognition system when multiple speech attempts by a user are allowed by using the results from all the speech attempts to determine what the spoken utterance may be.

In carrying out the above objects and other objects, features and advantages, of the present invention, a method is provided for improving the performance of a voice recognition system when multiple speech attempts by a user are allowed. The method includes the steps of determining at least one best word and corresponding word and non-word scores for each speech attempt by the user and determining at least one common best word among all the speech attempts. The method also includes the step of determining an objective measure for each of the at least one common best word for each speech attempt by the user. The objective measure represents a confidence level of the corresponding word and non-word scores. The method further includes the step of comparing each of the objective measures to a predetermined threshold. Finally, the method includes the step of classifying the multiple speech attempts by the user based on the comparison.

In further carrying out the above objects and other objects, features and advantages, of the present invention, a system is also provided for carrying out the steps of the above described method. The system includes means for determining at least one best word and corresponding word and non-word scores for each speech attempt by the user. The system also includes means for determining at least one common best word among all the speech attempts. The system further includes means for determining an objective measure for each of the at least one common best words for each speech attempt by the user. Still further, the system includes means for comparing each of the objective measures to a predetermined threshold. Finally, the system includes means for classifying the multiple speech attempts by the user based on the comparison.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
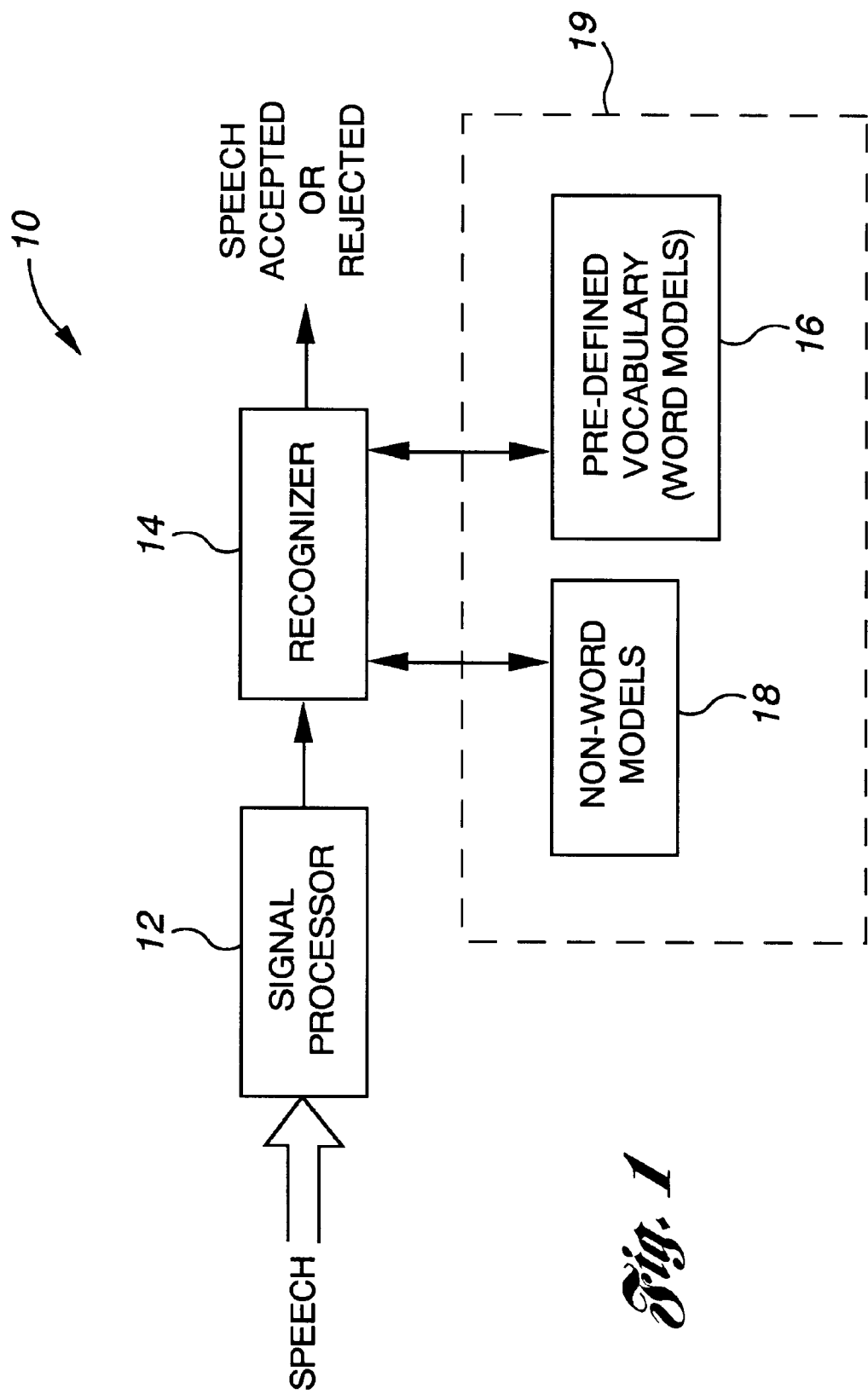
FIG. 1 is a block diagram of a voice recognition system in accordance with the present invention.

With reference to FIG. 1, there is shown a block diagram of a voice recognition system of the present invention, denoted generally by reference numeral 10. The system 10 includes a signal processor 12 for receiving a speech input, or test speech, and generating a test speech representation. A recognizer 14 is operatively coupled to the signal processor 12 for receiving the test speech representation. The recognizer 14 compares the test speech representation to an acceptable predefined vocabulary, or word models 16 and non-word models 18, stored in a memory 19 resulting in word scores and non-word scores, respectively.

Both a word score and a non-word score are determined based on how well the speech input from the user matches the word models 16 and the non-word models 18, respectively. The voice recognition system 10 may compute only a single non-word score for the entire spoken phrase and/or multiple non-word scores (e.g., one for each word score) that only use the segments of the spoken phrase used in calculating the respective word score. Based on the comparison of both the word and non-word scores, the recognizer 14 generates an output indicating whether the test speech has been accepted or rejected.

Figure 2:
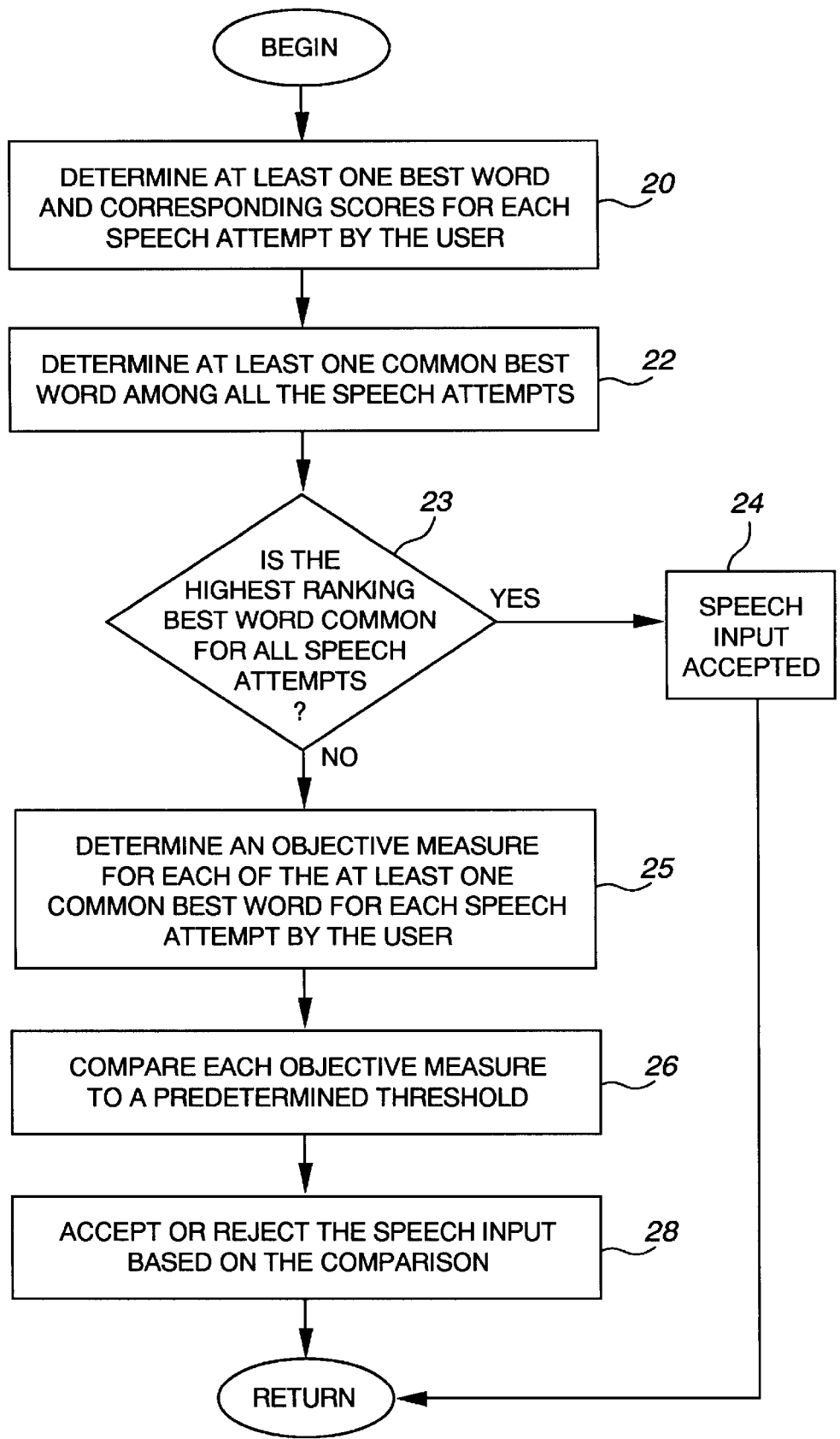
FIG. 2 is a block flow diagram illustrating the general sequence of steps associated with the operation of the present invention.

Turning now to FIG. 2, there is shown a simplified block flow diagram illustrating the general sequence of steps associated with the method of the present invention. After the voice recognition system 10 rejects the test input, at least one best word and the corresponding word and non-word scores are determined for each speech attempt made by the user, as shown at block 20. More than one best word, N, may be determined. For example, for each speech attempt by the user, the voice recognition system 10 determines a list of possible N-best word matches from the word models 16 and non-word models 18 and a list of corresponding word and non-word scores, respectively. The list is typically ranked so that the best word that most closely matches the speech input from the user is listed first.

Next, at least one common best word is determined from among all the speech attempts, as shown at block 22. If the highest-ranking best word for each attempt is common, then the speech input is accepted as corresponding to the highest-ranking word, as shown at blocks 23 and 24.

If the highest-ranking best word is not common for all the speech attempts, the method continues to determine an objective measure for the best words that are common in each attempt, as shown at block 25. To make this determination, the word score is compared to the non-word score to ensure that the word score is sufficiently acceptable.

Each of the objective measures are then compared to a predetermined acceptance threshold, as shown at block 26. The speech input is then accepted or rejected based on the comparison with the predetermined acceptance threshold, as shown at block 28.

Figure 3:
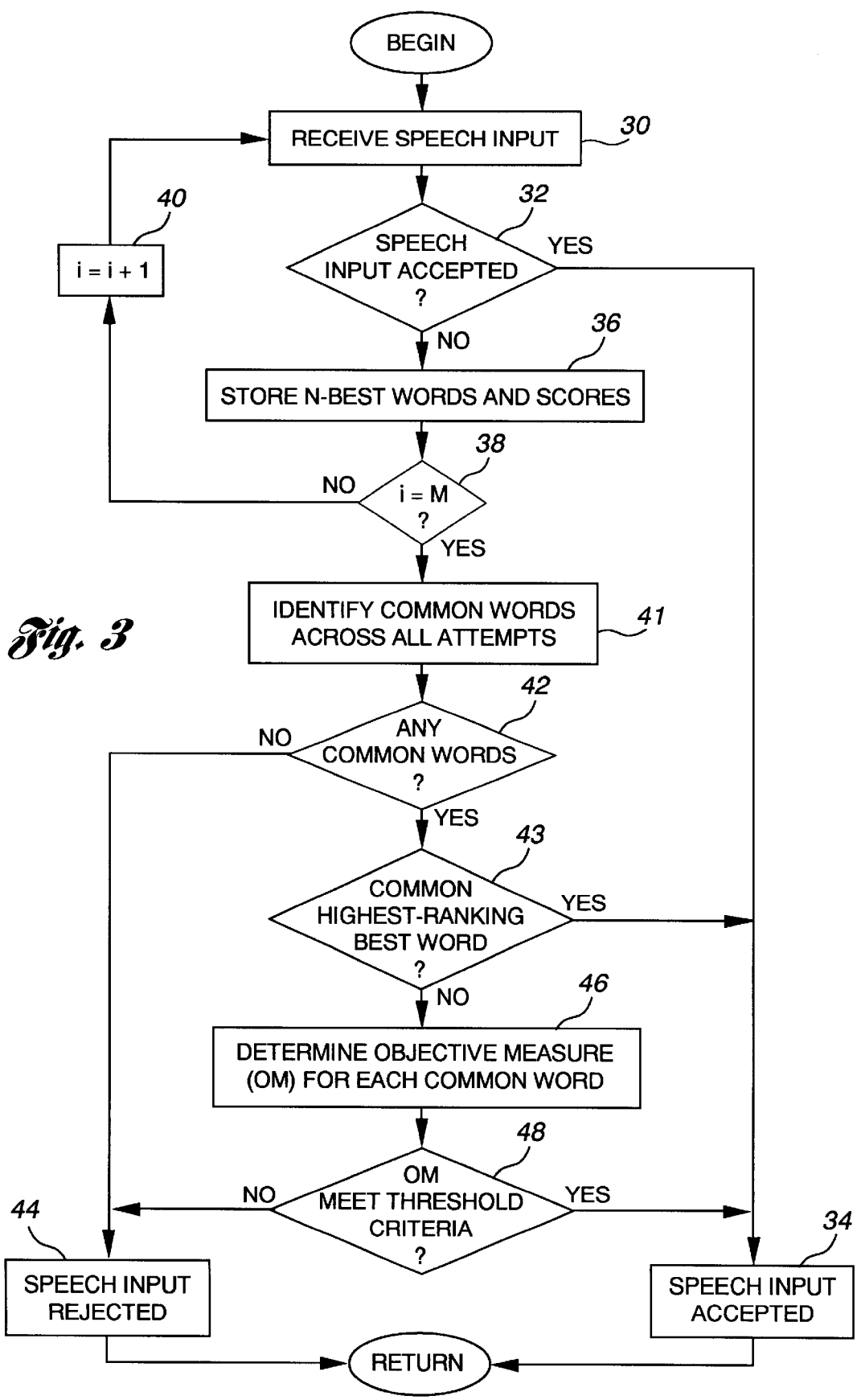
FIG. 3 is a more detailed block flow diagram of the method of the present invention.

Turning now to FIG. 3, there is shown a more detailed block flow diagram of the method of the present invention. The method begins with the step of receiving the speech input by the user, as shown at block 30. Next, the voice recognition system 10 determines whether or not the speech input can be accepted, as shown at conditional block 32. The speech input is accepted or rejected based on the comparison of the speech input with the word models 16 and the non-word models 18. If the speech input can be matched with a word in the predefined vocabulary 16, the speech input is accepted as shown at block 34.

If the speech input cannot be accepted, the N-best words and corresponding word and non-word scores are stored for this attempt, as shown at block 36. A comparison is then made to determine if the attempt, i, by the user has reached the maximum number of attempts, M, allowed by the voice recognition system 10, as shown at conditional block 38. If the maximum number of attempts has not be reached, a counter is incremented, as shown at block 40, and steps 30–38 are repeated until the maximum number of allowable speech input attempts by the user has been made or until an attempt has been accepted by the voice recognition system 10.

Once the user has attempted to recite the speech input the maximum number of times allowed by the voice recognition system 10, the method continues with the step of identifying the common words across all the attempts by the user, as shown at blocks 41 and 42. For example, consider a voice recognition system that allows two attempts, M=2, and three best words, N=3, for each attempt as follows:

| Attempt 1 | | | Attempt 2 | | |
| --- | --- | --- | --- | --- | --- |
| Best Word | Word Score | Non-Word Score | Best Word | Word Score | Non-Word Score |
| red | 0.85 | 1.12 | blue | 0.80 | 1.55 |
| blue | 0.87 | 1.09 | green | 0.87 | 1.24 |
| pink | 1.11 | 0.99 | red | 0.95 | 1.10 |

If no common best words are found across all attempts, the speech input by the user is rejected, as shown at block 44. If there are common best words found across all attempts, the method continues to determine if the highest-ranking best word is common across all attempts, as shown at conditional block 43. If the highest-ranking best word is common for each speech attempt, then the speech input is accepted as corresponding to the highest ranking best word, as shown at block 34.

If the highest-ranking best word is not common, then an objective measure is determined for each of the common best words across all attempts, as shown at block 46. The objective measure is the ratio between a word score and a non-word score. In the example above, the objective measure, OM, would be determined for the words "red" and "blue." OMs for the best words "pink" and "green" are not determined since they are not repeated. The OMs of attempts i=1 and i=2 for "red" are 0.76 (0.85/1.12) and 0.86 (0.95/1.10), respectively. The OMs of attempts i=1 and i=2 for "blue" are 0.79 (0.87/1.09) and 0.52 (0.80/1.55), respectively.

Next, the objective measures for each of the common best words are compared to threshold criteria, as shown at conditional block 48. If the common best word's OMs do not meet the predetermined threshold criteria, the speech input is rejected as shown at block 44. The word that finally meets all of the threshold criteria is used to accept the speech input, as shown at block 34. Referring again to the example above, if the threshold is selected as 0.8 maximum, then the word "red" would be rejected on the basis that the second attempt OM (0.95/1.10=0.86) exceeds the threshold. The word "blue" would be accepted since both OMs are below the threshold.

Figure 4:
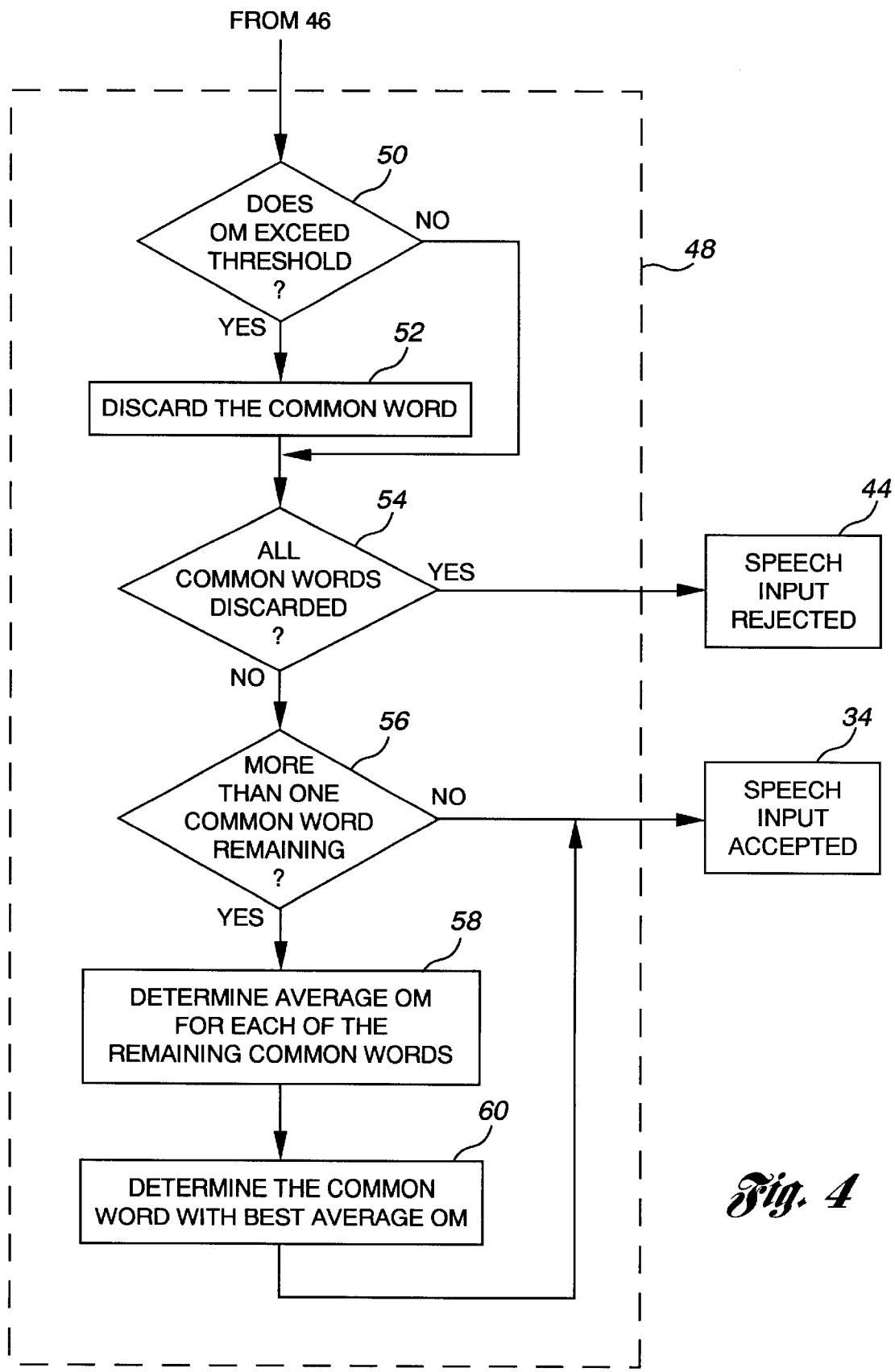
FIG. 4 is a block flow diagram of the objective measure determination process of the method of the present invention.

Turning now to FIG. 4, there is shown a block flow diagram further outlining the steps involved in comparing the OMs with a maximum predetermined threshold. The method would apply similarly if the threshold was chosen as a minimum value that must be met. The first step is to determine if any of the OMs exceed the predetermined threshold, as shown at conditional block 50. If the OM exceeds the predetermined threshold, then the common word is discarded from contention, as shown at block 52.

After the common word is discarded, a check is made to determine if all the common best words have been discarded, as shown at conditional block 54. If so, the speech input is rejected, as shown at block 44.

If there are some common words remaining that do not exceed the predetermined threshold, the method continues to determine if there is more than one common word remaining, as shown at conditional block 56. If there is only one common word remaining that does not exceed the predetermined threshold, the speech input is accepted, as shown at block 34.

If there is more than one common word remaining meeting the predetermined threshold, an average OM is determined for each of the remaining common best words, as shown at block 58. Next, the common word with the best average OM is determined, as shown at block 60. Finally, the common word determined at block 60 is used to accept the speech input, as shown at block 34. Thus, a common word is chosen to accept the speech input based on the fact that there was a fairly confident acceptance level spread across multiple attempts.

The present invention is a post-processing technique that could be made to work with any voice recognition system for improving accuracy, particularly when the system is designed to recognize more than a few words from a predefined vocabulary with multiple speech attempts allowed. The present invention could be implemented in a number of ways, including: a functional call within the application of the speech recognition system; within the Application Programming Interface (API) if the recognition takes place on a sub-system, or as part of the algorithm loaded on an individual processor (i.e., DSP (digital signal processor) chip).

While the best modes for carrying out the invention have been described in detail, those familiar with the art to which this invention relates will recognize various alternative designs and embodiments for practicing the invention as defined by the following claims.

What is claimed is:

1. A method for improving word classification performance of a speech recognition system allowing multiple speech attempts from a user, the method comprising:

storing a predefined vocabulary of word models and non-word models, the word models containing speech representations of acceptable words and the non-word models containing speech representations of non-words;

comparing each of the speech attempts to the word models and the non-word models to determine a plurality of best words and corresponding word scores and non-word scores for each of the speech attempts;

determining at least one common best word from among all the speech attempts;

determining if the at least one common best word is a highest-ranking best word based on the corresponding word scores for all speech attempts by the user;

if so, classifying the multiple speech attempts as the at least one common best word if the at least one common best word is the highest-ranking best word for all the speech attempts; and if not, performing an objective test on each of the at least one common best word to classify the multiple speech attempts.

2. The method as recited in claim 1 wherein performing the objective test further comprising:

determining an objective measure for each of the at least one common best word for each speech attempt comparing each of the objective measures to a predetermined threshold; and classifying the multiple speech attempts by the user based on the comparison if the at least one common best word is not the highest-ranking best word for all the speech attempts.

3. The method as recited in claim 2 wherein determining the objective measure includes determining a ratio between the word score and the non-word score for each of the at least one common best word.

4. The method as recited in claim 2 wherein classifying includes rejecting the speech attempt in response to the objective measure of any of the allowed multiple speech attempts failing to meet the predetermined threshold.

5. The method as recited in claim 2 wherein classifying further comprises:

determining an average objective measure for each of the at least one common best word; and accepting the at least one common best word having a best average objective measure when the objective measure of the at least one common best word of all of the speech attempts meets the predetermined threshold.

6. The method as recited in claim 1 wherein comparing includes storing each of the at least one best word and corresponding word and non-word scores after each speech attempt by the user.

7. The method as recited in claim 1 wherein determining the at least one common best word includes determining when a number of speech attempts by the user exceeds a predetermined allowable number of attempts.

8. A system for improving word classification performance of a speech recognition system allowing multiple speech attempts by a user, the system comprising:

a memory for storing a predefined vocabulary of word models and non-word models, the word models containing speech representations of acceptable words and the non-word models containing speech representations of non-words;

means for comparing each of the speech attempts to the word models and the non-word models to determine a plurality of best words and corresponding word scores and non-word scores for each of the speech attempts;

means for determining at least one common best word from among all the speech attempts;

means for determining if the at least one common best word is a highest-ranking best word based on the corresponding word scores for all speech attempts by the user;

means for classifying the multiple speech attempts as the at least one common best word if the at least one common best word is the highest-ranking best word for all the speech attempts; and means for performing an objective test on each of the at least one common best word if the at least one common best word is not the highest-ranking best word for all speech attempts.

9. The system as recited in claim 8 wherein the means for performing further comprising:

means for determining an objective measure for each of the at least one common best word for each speech attempt by the user representing a confidence level of the corresponding word and non-word scores; and means for comparing each of the objective measures to a predetermined threshold;

wherein the means for classifying is further operative to classify the multiple speech attempts by the user based on the comparison if the at least one common best word is not the highest ranking best word for all the speech attempts.

10. The system as recited in claim 9 wherein the means for determining the objective measure includes means for determining a ratio between the word score and the non-word score for each of the at least one common best word.

11. The system as recited in claim 9 wherein the means for classifying includes means for rejecting the speech attempt in response to the objective measure of any of the allowed multiple speech attempts failing to meet the predetermined threshold.

12. The system as recited in claim 9 wherein the means for classifying further comprises:
   means for determining an average objective measure for each of the at least one common best word; and
   means for accepting the at least one common best word having a best average objective measure when the objective measure of the at least one common best word of all of the speech attempts meets the predetermined threshold measure.

13. The system as recited in claim 8 wherein the means for comparing includes means for storing each of the at least one best word and corresponding word and non-word scores after each speech attempt by the user.

14. The system as recited in claim 8 wherein the means for determining the at least one common best word includes means for determining when a number of speech attempts by the user exceeds a predetermined allowable number of attempts.

* * * * *